United States Patent
Hell et al.

(10) Patent No.: US 6,481,555 B1
(45) Date of Patent: Nov. 19, 2002

(54) FRICTION LINING, ESPECIALLY FOR BRAKES AND CLUTCHES, AND A METHOD FOR PRODUCING A FRICTION LINING

(75) Inventors: Manfred Hell, Weyerbusch (DE); Wilfried Jaworek, Köln (DE); Werner Huppatz, Bonn (DE); Dietrich Wieser, Bonn (DE)

(73) Assignees: TMD Friction GmbH, Leverkusen (DE); VAW Aluminum AG, Bonn (DE)

( * ) Notice: Subject to any disclaimer, the term of this patent is extended or adjusted under 35 U.S.C. 154(b) by 0 days.

(21) Appl. No.: 09/720,091

(22) PCT Filed: Jun. 24, 1999

(86) PCT No.: PCT/EP99/04379

§ 371 (c)(1),
(2), (4) Date: Mar. 21, 2001

(87) PCT Pub. No.: WO99/67547

PCT Pub. Date: Dec. 29, 1999

(30) Foreign Application Priority Data

Jun. 25, 1998 (DE) .......................................... 198 28 301

(51) Int. Cl.$^7$ .............................................. F16D 69/02
(52) U.S. Cl. ............................ 192/107 M; 188/251 A; 188/251 M
(58) Field of Search .............. 192/107 M; 188/218 XL, 188/251 A, 251 M; 428/564; 106/1.29; 419/10

(56) References Cited

U.S. PATENT DOCUMENTS

| | | | |
|---|---|---|---|
| 2,089,080 A | * | 8/1937 | Valentine ................ 188/251 M |
| 4,078,946 A | * | 3/1978 | Anthony et al. ............. 148/440 |
| 4,141,725 A | * | 2/1979 | Murai et al. ........... 204/196.24 |
| 4,146,679 A | * | 3/1979 | Anthony et al. ............. 429/221 |
| 4,415,363 A | * | 11/1983 | Sanftleben et al. ...... 188/251 A |
| 4,502,581 A | * | 3/1985 | Komatsu ................ 192/107 M |
| 4,976,800 A | * | 12/1990 | Edwards ................. 188/251 A |
| 5,053,261 A | * | 10/1991 | Nishimura et al. ..... 188/251 M |
| 5,358,684 A | * | 10/1994 | Valentin ....................... 419/10 |
| 5,969,001 A | * | 10/1999 | Kawai .................... 192/107 M |
| 6,376,102 B1 | * | 4/2002 | Spriestersbach et al. .... 427/455 |

FOREIGN PATENT DOCUMENTS

| | | |
|---|---|---|
| EP | 0 079 732 A1 | 5/1983 |
| EP | 0 418 756 A2 | 3/1991 |
| JP | 58-128536 A * | 8/1983 |
| JP | 2-51268 A * | 2/1990 |

OTHER PUBLICATIONS

Aluminium–Gaschenbuch/Band 3: (pp. 737–740) Weiterverabeitung und Anwendung.

* cited by examiner

Primary Examiner—Rodney H. Bonck
(74) Attorney, Agent, or Firm—Diller, Ramik & Wight

(57) ABSTRACT

A friction lining, in particular for brakes and clutches, consisting of a friction material mixture of fibrous substances, organic binding agents, organic and/or inorganic fillers, lubricants, and metals or metal compounds, is characterized in that the friction material mixture contains an aluminum-zinc alloy with a zinc amount in the alloy of more than about 1 percent by weight, preferably more than about 2 percent by weight.

24 Claims, 1 Drawing Sheet

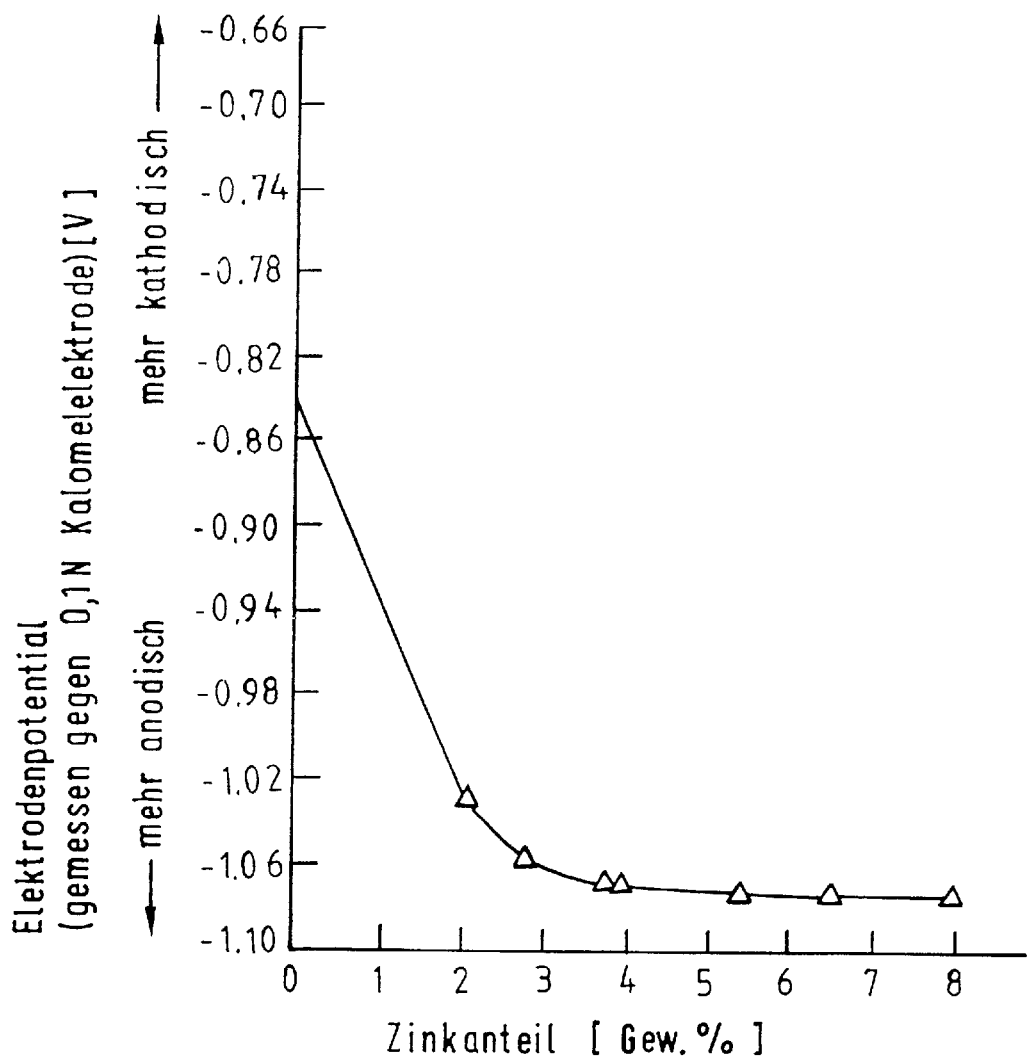

FRICTION LINING, ESPECIALLY FOR BRAKES AND CLUTCHES, AND A METHOD FOR PRODUCING A FRICTION LINING

BACKGROUND OF THE INVENTION

The invention refers to a friction lining, in particular for brakes and clutches, as well as to a method of producing the same. The invention further relates to a brake or clutch, as well as to the use of an anode alloy in a friction lining mixture.

Such friction linings are necessary for brakes and clutches, e.g for use in motor vehicles.

Conventional brake lining recipes have the following general structure:
- metals (as fibers or powder)
- fillers (incl. possible inorganic fibers)
- antiseize agents (solid lubricants)
- organic components (resins, rubbers, organic fibers, organic fillers).

Depending on the requirements, these four groups of raw materials are present in different proportions.

Important objective of the development of friction material are the optimizing of the friction value in conjunction with the friction partners of the friction lining, the reduction of the wear of the friction partners, and the optimizing of the thermal behavior of the friction partners.

During extended rest periods of vehicles or under rough environmental conditions, e.g. in sea climate, rust often occurs on the iron-containing friction partners, i.e. on the brake disc or the brake drum of a brake system, or on iron-containing clutch elements. For example, rust may cause the friction linings to seize to the frictional counterpart such that the clutch cannot be operated or the brakes cannot be released. Even if the friction linings are not stuck, functional disorders occur. Clutches are not operable as softly as usual. Also the brakes malfunction in operation due to an increased generation of noise during braking. At least as long as the layer of rust has not been removed by abrasion. A further disadvantage is the increased wear of the iron-containing friction partner due to the destruction by rust.

This problem is of particular importance with sea transports of vehicles that are often carried on transport ships for weeks.

From EP-A-0 079 732, it is already known to avoid rust in the steel and cast iron elements of brakes and clutches by coating the friction material with a metal using a flame-spraying method. This metal forms a less noble metal surface than steel and consists of an alloy of either zinc, aluminum or magnesium.

This approach merely prevents rusting during the transport of the vehicles over sea. The thin protective layer will be removed after a few operations of the brakes or the clutch, which is why rust may still occur if the vehicles are further stored in a vehicle yard. The known coating neither solves the problem with cars that often experience extended periods of standstill.

Thus, it is the object of the invention to provide a friction lining having corrosion protection properties.

SUMMARY OF THE INVENTION

The invention advantageously provides that the friction material mixture includes an alloy of aluminum and zinc, where the amount of zinc in the alloy is higher than about 1 percent by weight, preferably higher than about 2 percent by weight.

Providing a metal in the friction material mixture that is less noble than iron or steel prevents rusting of the iron or steel friction partner. The aluminum-zinc alloy components in the friction lining form a sacrificial anode so that rusting and, in particular, seizure of the friction partner to the friction lining by rusting can be reliably avoided. As an advantage, the sacrificial anode can always regenerate itself with the wear of the friction lining.

It is another advantage that the friction value can be made uniform by adding the aluminum-zinc alloy.

Corrosion inhibiting particles can become effective only if they are uniformly distributed over the cross section of the friction linings. This is achieved in a particularly favorable manner with an anode alloy of the type AlZn5 which is preferably added as a powder. Here, the term "anode alloy" refers to a material and an application technique as described in chapter 5.9.2 for the cathodic protection of steel in the Aluminium-Taschenbuch, 15. Ed., page 737.

The amount of zinc in the alloy can be between 2 and 8 percent by weight.

It is particularly preferred to set the amount of zinc in the anode alloy between 4 percent by weight and 6 percent by weight, because the galvanic effect can unfold in an optimum manner for the protection against corrosion.

The electrode potential of an aluminum-zinc alloy drops dramatically with the increase of the amount of zinc and reaches a minimum at an amount of about 5 percent by weight. Therefore, an amount of zinc of about 5 percent by weight is particularly preferred.

Since the friction linings include further components, optimum effects depend on the balancing of the components in the overall mixture. Under this aspect, the present anode alloy has been optimized using the following limits of contents:
- zinc 4.5 to 5.5%
- tin 0.05 to 0.2%
- gallium 0.02 to 0.25%
- silicon max. 0.5%
- iron max. 0.1%
- other additives each max. 0.01% and a total of max. 0.05%, remainder:
- aluminum.

The interaction between the optimized anode alloy and the other components maintains the electrochemical effect constant for the entire service life of the friction lining.

The optimized anode alloy comprises an additional amount of tin of 0.05 to 0.2 percent by weight that favorably alters the metal grid of the aluminum matrix, thereby removing passivity problems that otherwise occur in aluminum materials in aqueous electrolytes due to the protective oxide layer that hardly conducts ions and electrons.

The additional amount of 0.02 to 0.25 percent by weight of gallium has a positive, i.e. activating effect on the present anode alloy. The stationary localized corrosion potential of the aluminum anode alloy is thus again decreased so that its passive region is very much restricted and the present anode alloy, while in metal contact with steel, iron, copper, or other aluminum materials, etc., assumes the function of the sacrificial anode, wherein it is used up increasingly.

Another advantage may be achieved with the present anode alloy when it is added to the friction lining as a powder. Adding it as a powder reduces the sticking of iron an steel parts to the friction linings of brakes and clutches that occurs under particular environmental conditions, thereby reducing the so-called "adhesive corrosion".

The weight percentage of the aluminum-zinc alloy components in the friction material mixture may be between 0.5 and 15 percent by weight.

The aluminum-zinc alloy is introduced into the friction material mixture preferably as particles. As a lubricant, tin sulfides in percentage by weight between about 0.5 to 10 percent by weight, preferably about 2 to 8 percent by weight, can be included.

It is provided for manufacturing the friction lining first to liquify the aluminum zinc alloy, preferably present as bars or blocks, and then to atomize it so as to obtain substantially spherical particles. These particles are then mixed with a conventional friction material mixture and pressed to form a friction lining.

It is also possible to form powdery particles directly from the molt of the anode alloy, e.g. by atomizing or by spinning over the rim of a rotating disc.

The following is a detailed description of embodiments of the invention with reference to the accompanying sole drawing.

BRIEF DESCRIPTION OF THE DRAWINGS

FIG. 1 illustrates the influence of the zinc amount in an aluminum-zinc alloy on the electrode potential.

DESCRIPTION OF THE PREFERRED EMBODIMENTS

A friction lining mixture for brake and/or clutch linings usually contain the following components:

fibrous substances organic binding agents, organic and/or inorganic fillers, lubricants, and metals or metal compounds.

With such a friction lining mixture, it is proposed to add aluminum-zinc alloy components to the friction lining mixture, which serve as sacrificial anode within the friction lining, and to thereby protect the iron-containing friction partners of a friction lining, namely the brake disc, the brake drum or clutch elements, from corrosion, in particular adhesive corrosion, by a lower electrochemical potential.

Particularly suitable are aluminum-zinc alloys with a zinc amount in the alloy of more than about 1 percent by weight, preferably more than about 2 percent by weight.

As is evident from FIG. 1, the electrode potential decreases as the weight percentage of zinc in the aluminum-zinc alloy increases, the decrease being very drastic in the region from 0 to 2 percent by weight of zinc, to reach a minimum at about 4.5 to 5 percent by weight, which minimum changes only slightly even at higher weight percentages of zinc. Inasmuch, a weight percentage between 2 and 8 percent by weight, preferably between 4 and 6 percent by weight, is sufficient to arrive at an optimum decrease in electrode potential.

The weight percentage of the aluminum-zinc alloy in the friction lining should be between about 0.5 percent by weight and 15 percent by weight.

Fillers may be, either individually or in combination with other fillers, metal oxides, metal silicates and/or metal sulfates. Preferably, the fibrous substances are aramide fibers and/or other organic or inorganic fibers. Besides the aluminum-zinc alloy, metals contained can be steel wool and/or copper wool, for example.

The lubricants used are, preferably, tin sulfides in a percentage by weight of 0.5 to 10 percent by weight, preferably 2 to 8 percent by weight. The tin sulfides may also be mixed to the friction lining mixture as powder, for example.

Preferably, the aluminum-zinc alloy is added to the friction lining mixture as particles. To this end, the aluminum-zinc alloy present in bars or blocks is first liquified and then atomized, thereby forming substantially spherical aluminum-zinc particles added to the friction material mixture as particles, the friction lining mixture being adapted to be pressed in a conventional manner.

EXAMPLE

For example, a friction lining mixture may be composed as follows:

| Raw materials | Percentage by weight |
| --- | --- |
| steel wool | 15–25 |
| copper and/or copper alloys | 3–20 |
| aluminum-zinc alloy | 0.5–15 |
| aluminum oxide | 0.5–2 |
| glimmer powder | 5–8 |
| heavy spar | 5–15 |
| iron oxide | 5–15 |
| tin sulfides | 2–8 |
| graphite | 2–6 |
| coke powder | 10–20 |
| aramide fibers | 1–2 |
| resin filler powder | 2–6 |
| binding resin | 3–7 |

Although a preferred embodiment of the invention has been specifically illustrated and described herein, it is to be understood that minor variations may be made in the apparatus without departing from the spirit and scope of the invention, as defined the appended claims.

What is claimed is:

1. A friction lining particularly for brakes and clutches comprising a friction material mixture of fibrous substances, organic binding agents, at least one of organic and inorganic fillers, lubricants, and metals or metals compounds; and the friction material mixture containing an aluminum-zinc alloy with a zinc amount in the alloy ranging between more than about 1 percent by weight to about 15 percent by weight.

2. The friction lining of claim 1, wherein the amount of zinc in the alloy is between 2 and 8 percent by weight, preferably between 4 percent by weight and 6 percent by weight.

3. The friction lining of claim 2, wherein the weight percentage of the aluminum-zinc alloy in the friction lining is between about 0.5 percent by weight and 15 percent by weight.

4. The friction lining of claim 2, wherein the aluminum-zinc alloy is an anode alloy of the type alZn5.

5. The friction lining of claim 2, wherein the aluminum-zinc alloy used as the anode electrode has the following composition:

zinc 4.5 to 5.5% tin 0.05 to 0.2% gallium 0.2 to 0.25% silicon max. 0.5% iron max. 0.1% other additives each max. 0.01% and a total of max 0.05%, remainder: aluminum.

6. The friction lining of claim 1, wherein the weight percentage of the aluminum-zinc alloy in the friction lining is between about 0.5 percent by weight and 15 percent by weight.

7. The friction lining of claim 1, wherein the aluminum-zinc alloy is an anode alloy of the type AlZn5.

8. The friction lining of claim 1, wherein the aluminum-zinc alloy used as the anode electrode has the following composition:
- zinc 4.5 to 5.5%
- tin 0.05 to 0.2%
- gallium 0.02 to 0.25%
- silicon max. 0.5%
- iron max. 0.1%
- other additives each max. 0.01% and a total of max. 0.05%, remainder: aluminum.

9. The friction lining of claim 1, wherein the aluminum-zinc alloy is added to the friction material mixture as one of particles, wool and fibers.

10. The friction lining of claim 1, wherein the percentage
- of metals is 0 to 70 percent by weight,
- of fillers is 3 to 50 percent by weight,
- of lubricants is 10 to 45 percent by weight, and
- of organic additives is 3 to 25 percent by weight.

11. The friction lining of claim 1, wherein the lubricants contain between 0.5 to 10 percent by weight tin sulfides.

12. The friction lining of claim 1, wherein, besides the aluminum-zinc alloy, metals contained are steel wool and/or copper wool.

13. The friction lining of claim 1, wherein the fillers included are, either individually or in combination with other fillers, metal oxides, metal silicates and/or metal sulfates.

14. The friction lining of claim 1, wherein the fibrous substances are aramide fibers and/or other organic or inorganic fibers.

15. The friction lining of claim 1, wherein the friction material mixture includes
- metals in a proportion of 30 to 40 percent by weight,
- fillers in a proportion of 20 to 35 percent by weight,
- solid lubricants in a proportion of 20 to 30 percent by weight, and
- organic components in a proportion of 5 to 15 percent by weight.

16. The friction lining of claim 1, wherein the friction material mixture includes steel wool in a proportion of 15 to 25 percent by weight, one of copper and copper alloys in a proportion of 3 to 20 percent by weight, aluminum-zinc alloy in a proportion of 0.5 to 15 percent by weight, aluminum oxide in a proportion of 0.5 to 2 percent by weight, glimmer powder in a proportion of 5 to 8 percent by weight, heavy spar in a proportion of 5 to 15 percent by weight, iron oxide in a proportion of 5 to 15 percent by weight, tin sulfides in a proportion of 2 to 8 percent by weight, graphite in a proportion of 2 to 6 percent by weight, coke powder in a proportion of 10 to 20 percent by weight, aramide fibers in a proportion of 1 to 2 percent by weight, resin filler powder in a proportion of 2 to 6 percent by weight, and binding resin in a proportion of 3 to 7 percent by weight.

17. The friction lining of claim 1, wherein the amount of zinc in the alloy is between 4 and 6 percent by weight.

18. The friction lining of claim 17, wherein the weight percentage of the aluminum-zinc alloy in the friction lining is between about 0.5 percent by weight and 15 percent by weight.

19. The friction lining of claim 17, wherein the aluminum-zinc alloy is an anode alloy of the type AlZn5.

20. The friction lining of claim 17, wherein the aluminum-zinc alloy used as the anode electrode has the following composition:
- zinc 4.5 to 5.5%
- tin 0.05 to 0.2%
- gallium 0.2 to 0.25%
- silicon max. 0.5%
- iron max. 0.1%
- other additives each max. 0.01% and a total of max 0.05%, remainder: aluminum.

21. The friction lining of claim 1, wherein the lubricants contained between 2 to 8 percent by weight, tin sulfides.

22. A method of producing a friction lining for brake and clutch linings comprising a friction material mixture including fibrous substances, organic binders, one of organic and inorganic fillers, lubricants, and metals or metal compounds by performing the steps of atomizing a liquified aluminum-zinc alloy for producing substantially spherical particles, mixing the aluminum-zinc particles with the friction lining mixture, and pressing the friction material mixture to form a friction lining.

23. The method of claim 22, wherein, prior to atomizing, the bars or blocks of aluminum-zinc alloy are liquified.

24. A friction material mixture comprising fibrous substances, organic binders, one of organic and inorganic fillers, lubricants, one of metals and metal compounds, an aluminum-zinc alloy for producing a friction lining with corrosion protection properties, and the aluminum-zinc alloy in the friction material mixture serves as a sacrificial anode for the corrosion protection of the one of metal and metal compounds.

* * * * *